United States Patent
Jiang et al.

(10) Patent No.: US 9,442,589 B2
(45) Date of Patent: Sep. 13, 2016

(54) TOUCH PANEL AND FABRICATION METHOD THEREOF

(71) Applicant: TPK Touch Solutions (Xiamen) Inc., Xiamen (CN)

(72) Inventors: Yau-Chen Jiang, Hsinchu (TW); Jianbin Yan, Putian (CN); Ho-Hsun Chi, Hsinchu (TW); Defa Wu, Jinjiang (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 179 days.

(21) Appl. No.: 14/256,996

(22) Filed: Apr. 21, 2014

(65) Prior Publication Data

US 2014/0320765 A1    Oct. 30, 2014

(30) Foreign Application Priority Data

Apr. 24, 2013   (CN) .......................... 2013 1 0147814

(51) Int. Cl.
G06F 3/041    (2006.01)
(52) U.S. Cl.
CPC ..... *G06F 3/041* (2013.01); *G06F 2203/04103* (2013.01)
(58) Field of Classification Search
None
See application file for complete search history.

(56) References Cited

U.S. PATENT DOCUMENTS

| | | | | |
|---|---|---|---|---|
| 2012/0268402 A1* | 10/2012 | Wang | ...................... | G06F 3/041 345/173 |
| 2013/0106747 A1* | 5/2013 | Choi | ...................... | G06F 3/041 345/173 |
| 2013/0113752 A1* | 5/2013 | Chang | ...................... | G06F 3/044 345/174 |
| 2013/0141380 A1* | 6/2013 | Wang | ...................... | G06F 3/041 345/173 |
| 2013/0321433 A1* | 12/2013 | Bita | ...................... | G06F 3/044 345/501 |
| 2014/0174789 A1* | 6/2014 | Jiang | ...................... | G06F 3/044 174/250 |
| 2014/0247226 A1* | 9/2014 | Chiu | ...................... | G06F 3/041 345/173 |

\* cited by examiner

*Primary Examiner* — Andrew Sasinowski
*Assistant Examiner* — Henok Heyi
(74) *Attorney, Agent, or Firm* — Cooper Legal Group, LLC

(57) ABSTRACT

A touch panel having a display region and a periphery region is disclosed, wherein the touch panel comprises a cover substrate, a patterned mask layer formed on the cover substrate and the patterned mask layer includes a pattern region. The periphery region is defined by the patterned mask layer. A first electrode pattern having a plurality of first jumpers is disposed on the cover substrate and correspondingly to the display region, and a second electrode pattern having a plurality of second jumpers is disposed on the patterned mask layer and correspondingly to the pattern region, wherein the first jumpers and the second jumpers comprise different materials.

16 Claims, 14 Drawing Sheets

TOUCH PANEL AND FABRICATION METHOD THEREOF

BACKGROUND OF THE INVENTION

The present invention claims the priority of China Patent Application No. 201310147814.3 filed on Apr. 24, 2013, which is incorporated by reference in the present application in its entirety.

FIELD OF THE INVENTION

The present invention relates to the field of touch input technologies and more particularly to a single substrate touch panel and a manufacturing method thereof.

DESCRIPTION OF THE PRIOR ART

Nowadays, personal digital assistants (PDA), mobile phones, notebook computers, tablet PCs and other portable electronic products are wildly used in modern life. Since these electronic products need to be thinner and lighter, the traditional input devices, such as keyboards or mice have to be replaced with other input devices. In addition, the needs for tablet PCs has greatly increased, hence the touch panel technology has became one of the key components in electronic products.

A touch panel generally has a display region and a periphery region, wherein the display region functions as a touch screen which detects and controls objects by a single or multiple touches, and the periphery region provides necessary space for accumulating pressing buttons. However, breaches formed on surfaces of the touch panels are necessary to arrange such pressing buttons, which not only ruins the smoothness of the entire appearance of the touch panel, but also complicates the fabrication thereof.

BRIEF SUMMARY OF THE INVENTION

The present invention provides a touch panel and a fabrication method thereof, which provides various touching responses on the same surfaces of the touch panel through modified structure designs and electrode patterns of the touch panel. Furthermore, the materials of jumpers of the electrode patterns within the display region and within the periphery region of the touch panel may different, so that the jumpers of the electrode patterns within periphery region become more reliable.

The present invention provides a touch panel having a display region and a periphery region, with the touch panel comprising a cover substrate, a patterned mask layer formed on the cover substrate, wherein the patterned mask layer includes a pattern region, and the periphery region is defined by the patterned mask layer, a first electrode pattern having a plurality of first jumpers, with the first electrode pattern being disposed on the cover substrate and corresponding to the display region, and at least one second electrode pattern having a plurality of second jumpers, with the second electrode pattern being disposed on the patterned mask layer and corresponding to the pattern region, wherein the first jumpers and the second jumpers comprise different materials.

In one embodiment, the second electrode pattern electrically connects to the first electrode pattern and serves as an extension of the first electrode pattern.

In one embodiment, the pattern region further comprises a hollow pattern.

In one embodiment, the touch panel further comprises a color film corresponding to the patterned mask layer.

In one embodiment, the first electrode pattern and the second electrode pattern are classified as a sensing electrode layer.

In one embodiment, the touch panel further comprises a passivation layer disposed on the sensing electrode layer.

In one embodiment, the first electrode pattern comprises a plurality of parallel first sensing electrodes extending along a first axial direction and a plurality of second sensing electrodes disposed along a second axial direction and parallel to each other. The first sensing electrodes are electrically isolated from the second sensing electrodes; the second electrode pattern comprises a plurality of parallel third sensing electrodes extending along the first axial direction and a plurality of fourth sensing electrodes disposed along the second axial direction and parallel to each other, and the third sensing electrodes are electrically isolated from the fourth sensing electrodes.

In one embodiment, each of the second sensing electrodes comprises a plurality of second conductive units disposed along the second axial direction and spaced from each other, wherein every two adjacent second conductive units are electrically connected via the first jumpers.

In one embodiment, each of the fourth sensing electrodes comprises a plurality of fourth conductive units disposed along the second axial direction and spaced from each other, wherein every two adjacent fourth conductive units are electrically connected via the second jumpers.

In one embodiment, the first jumpers comprise a transparent conductive material and the second jumpers comprise a metal.

In one embodiment, the sensing electrode layer further comprises an insulating layer disposed between the first sensing electrodes and the second sensing electrodes, as well as between the third sensing electrodes and the fourth sensing electrodes.

In one embodiment, the touch panel further comprises a trace corresponding to the periphery region, wherein the trace is electrically connected to the first electrode pattern and the second electrode pattern.

The present invention also provides a fabrication method of a touch panel having a display region and a periphery region corresponding to the display region, wherein the fabrication method of touch panel comprises the following steps: forming a patterned mask layer on a cover substrate, wherein the patterned mask layer comprises a pattern region, and the patterned mask layer defines the periphery region, forming a sensing electrode layer having a first electrode pattern corresponding to the display region and a second electrode pattern corresponding to the pattern region, wherein the first electrode pattern comprises a plurality of first jumpers, the second electrode pattern comprises a plurality of second jumpers, and the first jumpers and the second jumpers comprise different materials.

In one embodiment, the second jumpers are formed on the patterned mask layer and directly contact the patterned mask layer.

In one embodiment, the fabrication method of touch panel further comprises forming a color film corresponding to the patterned mask layer.

In one embodiment, the fabrication method of a touch panel further comprises forming a passivation layer on the sensing electrode layer.

In one embodiment, the step of forming the sensing electrode layer further comprises: coating a conductive layer on the cover substrate and the patterned mask layer; patterning the conductive layer to form a plurality of parallel first sensing electrodes along a first axial direction within the display region and a plurality of parallel third sensing electrodes along the first axial direction within the periphery region, and to form a plurality of second sensing electrodes disposed along a second axial direction and spaced from each other within the display region and a plurality of fourth sensing electrodes along the second axial direction and spaced from each other within the periphery region; coating and patterning an insulating layer at partial regions of the first sensing electrodes and partial regions of the third sensing electrodes; forming the first jumpers on the insulating layer coated on the first sensing electrodes, with the first jumpers electrically connecting every two adjacent second conductive units to each other; and forming the second jumpers on the insulating layer coated on the third sensing electrodes, with the second jumpers electrically connecting every two adjacent fourth conductive units to each other.

In one embodiment, the step of forming the sensing electrode layer further comprises: forming the first jumpers on the cover substrate, within the display region; forming the second jumpers on the patterned mask layer, within the periphery region; coating an insulating layer on the cover substrate, the patterned mask layer, the first jumpers and the second jumpers; patterning the insulating layer to form a plurality of via holes, with the via holes corresponding to two ends of the first jumpers and the second jumpers respectively so as to expose partial regions of the first jumpers and the second jumpers; coating a conductive layer on the insulating layer and the via holes; and patterning the conductive layer to form a plurality of parallel first sensing electrodes disposed along a first axial direction within the display region, a plurality of parallel third sensing electrodes disposed along the first axial direction within the periphery region, a plurality of second conductive units disposed along a second axial direction and spaced from each other within the display region, and a plurality of fourth conductive units disposed along the second axial direction and spaced to each other within the periphery region, wherein the via holes are covered with the second conductive units and the fourth conductive units to electrically connect any two adjacent second conductive units and any two adjacent fourth conductive units via the first jumpers and second jumpers respectively.

In one embodiment, the first jumpers comprise a transparent conductive material and the second jumpers comprise a metal.

In one embodiment, the fabrication method of touch panel further comprises a trace corresponding to the periphery region, wherein the trace is electrically connected to the first electrode pattern and the second electrode pattern.

Based on above disclosure, the touch panel and the fabrication thereof of the present invention has electrodes both within the display region and the periphery region, so as to provide touch function within the display region and within the periphery region of the touch panel respectively. Accordingly, it is unnecessary to form any breaches on the surfaces of the touch panel, thereby successfully achieving smoothness on surfaces of touch panels and easing cleaning. Also, the touch panel of the present invention comprises various materials in jumpers formed on electrode patterns within the display region and the periphery region respectively, so that the display region achieves better light transmittance and the periphery region has more reliable jumpers.

These and other objectives of the present invention will no doubt become obvious to those of ordinary skill in the art after reading the following detailed description of the preferred embodiment that is illustrated in the various figures and drawings.

DETAILED DESCRIPTION OF INVENTION

To provide a better understanding of the present invention to users skilled in the technology of the present invention, preferred embodiments are detailed as follows. The preferred embodiments of the present invention are illustrated in the accompanying drawings with numbered elements to clarify the contents and effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 1:
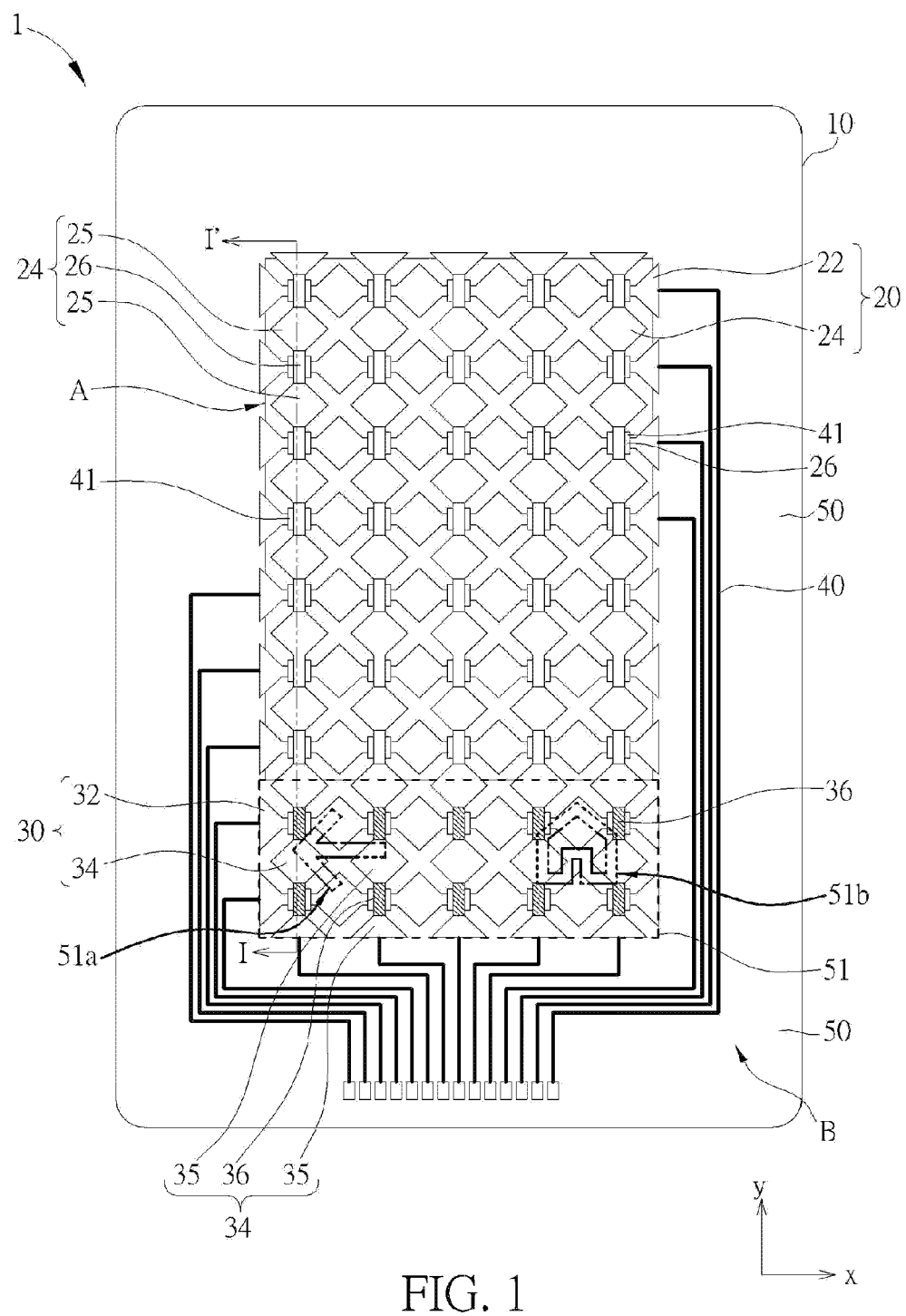
FIG. 1 is a top-view diagram illustrating a touch panel in accordance with one embodiment of the present invention.

FIG. 1 illustrates a top-view diagram of the touch panel according to the first preferred embodiment of the present invention, wherein a provided touch panel 1 is common in various electric devices having a displaying screen, such as computers, mobile phones, cameras, acoustic equipments and auto-equipments. The touch panel 1 of the present embodiment detailed in the following is shown in FIG. 1 from a back view, wherein the back view of the touch panel 1 refers to a surface not touched by the user when using the touch panel. The touch panel 1 comprises a cover substrate 10, a first electrode pattern 20, at least one second electrode pattern 30, and a patterned mask layer 50, as shown in FIG. 1.

The touch panel 1 has a display region A and a periphery region B according to the display region A, wherein the periphery region B can be disposed at a lateral side of the display region A. In the embodiments of the present invention, the periphery region B is disposed around a periphery of the display region A, with the display region A being surrounded by the periphery region B. Specifically, the active region of the electric device is aligned with the display region A, and the periphery region B is defined by the patterned mask layer 50 formed on the cover substrate 10, providing shading and hiding properties to the periphery of the display region A. In the present embodiment, the patterned mask layer 50 can comprise an opaque material, such as a black photoresist, which can be formed by printing or coating. Moreover, the patterned mask layer 50 of the present embodiment further comprises a pattern region 51, and the pattern region 51 comprises at least one hollow pattern, for example hollow patterns 51a and 51b, which serve as a return button and a home button in the present embodiment, wherein the hollow patterns 51a and 51b of the pattern region 51 are not limited to the type and the amount described above; other buttons, like menu buttons or switch buttons based on practical use, can also be formed.

A first electrode pattern 20 is disposed within the display region A, such that the display region A can not only serves as a window for superimposing images, but also as a means for detecting and controlling the touching responses thereon. A second electrode pattern 30 is disposed within the periphery region B, correspondingly to the pattern region 51 of the patterned mask layer 50 so that the periphery region B can perform touching responses like virtual buttons.

Figure 2:
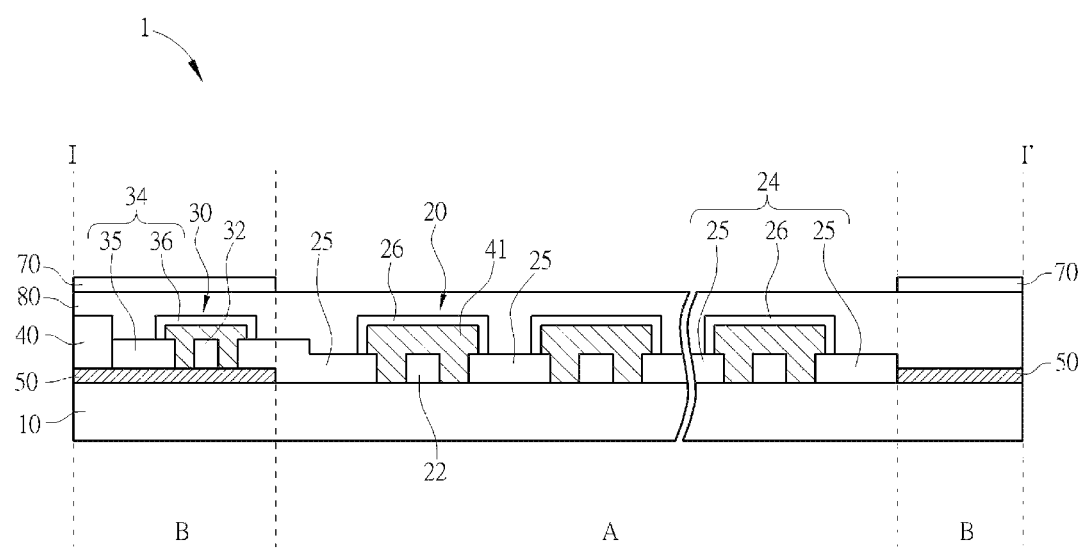
FIG. 2 is a cross sectional diagram taken along a cross line I-I' in FIG. 1.

In order to specifically describe the structure of the touch panel 1 of the present embodiment please refer to FIG. 2, which is a cross sectional diagram of FIG. 1 taken from line I-I'. The first electrode pattern 20 and the patterned mask layer 50 of the present embodiment are both disposed on the cover substrate 10, and the second pattern 30 is further disposed on the patterned mask layer 50. The cover substrate 10 comprises a transparent material, such as glass. Moreover, the cover substrate 10 of the present embodiment can further be subjected to a surface treatment including strengthening, antiglare, and antibacterial treatments. Thus, the cover substrate 10 of the present embodiment can be also utilized as a protection substrate, and achieves more functions than a mere substrate for touch screens.

During the fabrication, the first electrode pattern 20 and the second electrode pattern 30 can be regarded as a sensing electrode layer fabricated by the same process, wherein the first electrode pattern 20 comprises a plurality of parallel first sensing electrodes 22 extending along a first axial direction (being the X-axis in the present embodiment) and a plurality of second sensing electrodes 24 disposed along a second axial direction (being the Y-axis in the present embodiment) and parallel to each other. The first sensing electrodes 22 are electrically isolated with the second sensing electrodes 24. The second electrode pattern 30 comprises a plurality of parallel third sensing electrodes 32 extended along the first axial direction (being the X-axis in the present embodiment) and a plurality of fourth sensing electrodes 34 disposed along the second axial direction (being the Y-axis in the present embodiment) and parallel to each other, wherein the third sensing electrodes 32 are electrically isolated with the fourth sensing electrodes 34.

More specifically, each of the first sensing electrodes 22, as well as each of the third sensing electrodes 32 performs like a continuous structure, namely an integrated structure with no gap in between. Also, each of the second sensing electrodes 24 comprises a plurality of second conductive units 25 and a plurality of first jumpers 26, and each of the fourth sensing electrodes 34 comprises a plurality of fourth conductive units 35 and a plurality of second jumpers 36. The first sensing electrodes 22, the third sensing electrodes 32, the second conductive units 25 and the fourth conductive units 35 are all formed from the same conductive layer through a same photolithography process. Namely, the first sensing electrodes 22, the third sensing electrodes 32, the second conductive units 25 and the fourth conductive units 35 are all classified as a conductive layer. Furthermore, the first jumpers 26 cross over the first sensing electrodes 22 respectively to electrically connect every two adjacent second conductive units 25 in the second axial direction, and the second jumpers 36 cross over each of the third sensing electrodes 32 to electrically connect every two adjacent fourth conductive units 35 in the second axial direction.

It is noted that, the first jumpers 26 are formed from a wiring layer through photolithography, and the second jumpers 36 are formed from another wiring layer also through photolithography. That is to say, although both the first jumpers 26 and second jumpers 36 belong to wiring layers, but the first jumpers 26 and the second jumpers 36 comprise different materials and are fabricated through different processes in the present embodiment. As an example, the first jumpers 26 comprise the same transparent conductive material as the conductive layer, such as indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (Hfo), indium gallium zinc oxide, (InGaZnO), indium gallium zinc magnesium oxide (InGaZnMgO), indium gallium magnesium oxide (InGaMgo) or indium gallium aluminum oxide (InGaAlO), in order to retain the transmittance of the display region A. The second jumpers 36 within the periphery region B preferably comprise a metal, such as silver, aluminum, gold or copper, so as to reduce the occurrence of fractures and to enhance reliability. However, materials of the first jumpers 26 and the second jumpers 36 are not limited to what is mentioned above, and be further modified according to the actual requirements.

Then, the touch panel 1 further comprises an insulating layer 41. In the present embodiment, the insulating layer 41 is disposed both between the first sensing electrodes 22 and the second sensing electrodes 24, and between the third sensing electrodes 32 and the fourth electrodes 34. In this way the first sensing electrodes 22 are electrically isolated with the second sensing electrodes 24 and the third sensing electrodes 32 are electrically isolated with the fourth sensing electrodes 34. With such the stacking sequence mentioned above, the sensing electrode layer stacked by the wiring layer, the insulating layer 41 and the sensing electrode layer of the present embodiment is disclosed.

The touch panel 1 of the present embodiment further comprises a trace 40 disposed within the periphery region B, wherein the trace 40 is electrically in contact with the first electrode pattern 20 and the second electrode pattern 30. The trace 40 is further electrically connected to a controller (not shown in the drawings) outside the touch panel 1 to accommodate signal transductions between the controller and the first and second electrode pattern 20 and 30. The trace 40 of the present embodiment can comprise the same metal as the second jumpers 36 and be fabricated through the same photolithography process as well, thereby simplifying the fabrication of the touch panel. The trace 40 of the present embodiment also classify as a wiring layer.

To be more precise, the second electrode pattern 30 is electrically connected to the first electrode pattern 20, which may be regarded as an extension of the first electrode pattern 20. Accordingly, the first electrode pattern 20 and the second electrode pattern 30 can be fabricated integrally, thereby performing a touching response of the first electrode pattern 20 and the second electrode pattern 30. In the present embodiment, only the jumpers of the first electrode pattern 20 comprise different materials from those of the second electrode 30. According to the present invention, fabrication steps of the first jumpers 26 and the second jumpers 36 are not limited to the order disclosed in the previous embodiments, and can be freely modified according to specific requirements.

Finally, the touch panel 1 of the present embodiment can further comprise a passivation layer 80, which is disposed on the sensing electrode layer, with the sensing electrode layer being entirely covered by the passivation layer 80, so as to protect the panel against erosion or physical damages.

Furthermore, the pattern region 51 of the patterned mask layer 50 in the present embodiment comprises the hollow patterns 51a and 51b, namely a portion allowing light transmission. The touch panel 1 of the present embodiment further comprises a color film 70 coated on the passivation layer 80, wherein the color film 70 corresponds to the patterned mask layer 50, thereby displaying color in the hollow patterns 51a and 51b of the pattern region 51. The color film 70 can be formed by either painting or printing a color ink, a color photoresist or a light guide ink, or sticking an adhesive film. The color film 70 is but not limit to comprise a single color. Thus, the touch panel 1 of the present embodiment will have a preferred and more colorful appearance. In this way, it is easy to create specific and unique products under simple variation of colors on the color film 70. It is noted that, the color film 70 is not limited to be disposed on the passivation layer 80, which can be also disposed on other layers of the touch panel 1 correspondingly to the patterned mask layer 50.

Figure 3:
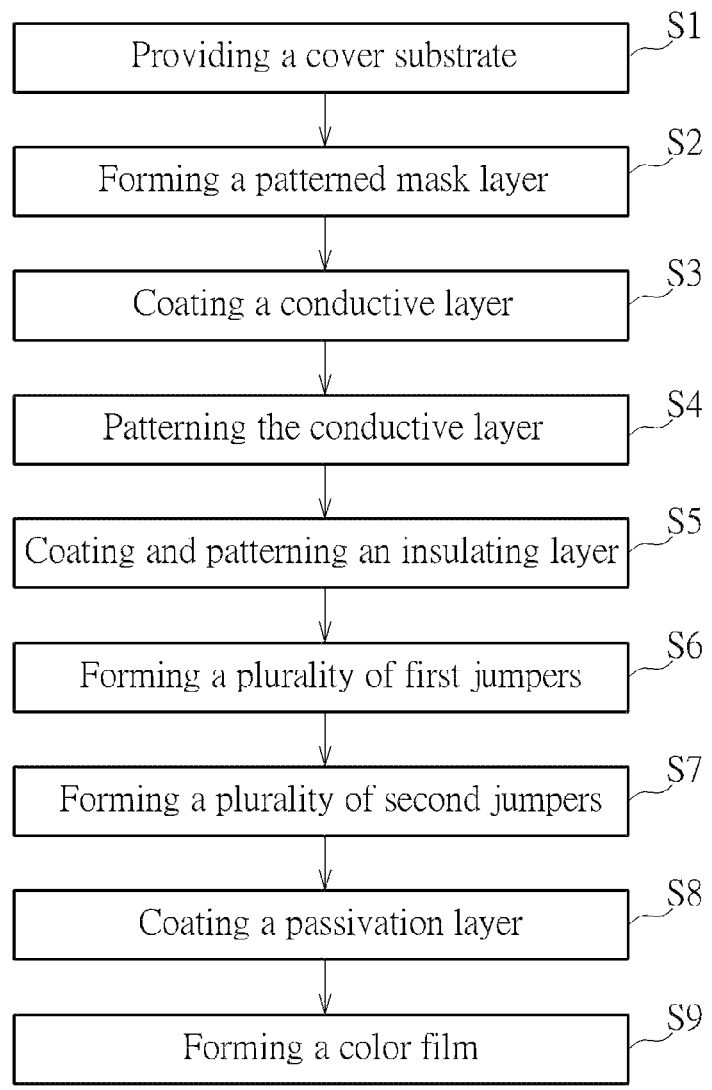
FIG. 3 is a flow chart illustrating the fabrication method of a touch panel in accordance with a first preferred embodiment of the present invention.

In accordance with the first preferred embodiment of the present invention, the fabrication of the touch panel 1 is detailed in the following with reference to FIG. 3 based on the cross-sectional diagram of FIG. 2. In the further description, top-view diagrams in FIGS. 4-7 illustrating the fabrication method of the touch panel according to the first preferred embodiment can also be referred to.

Figure 4:
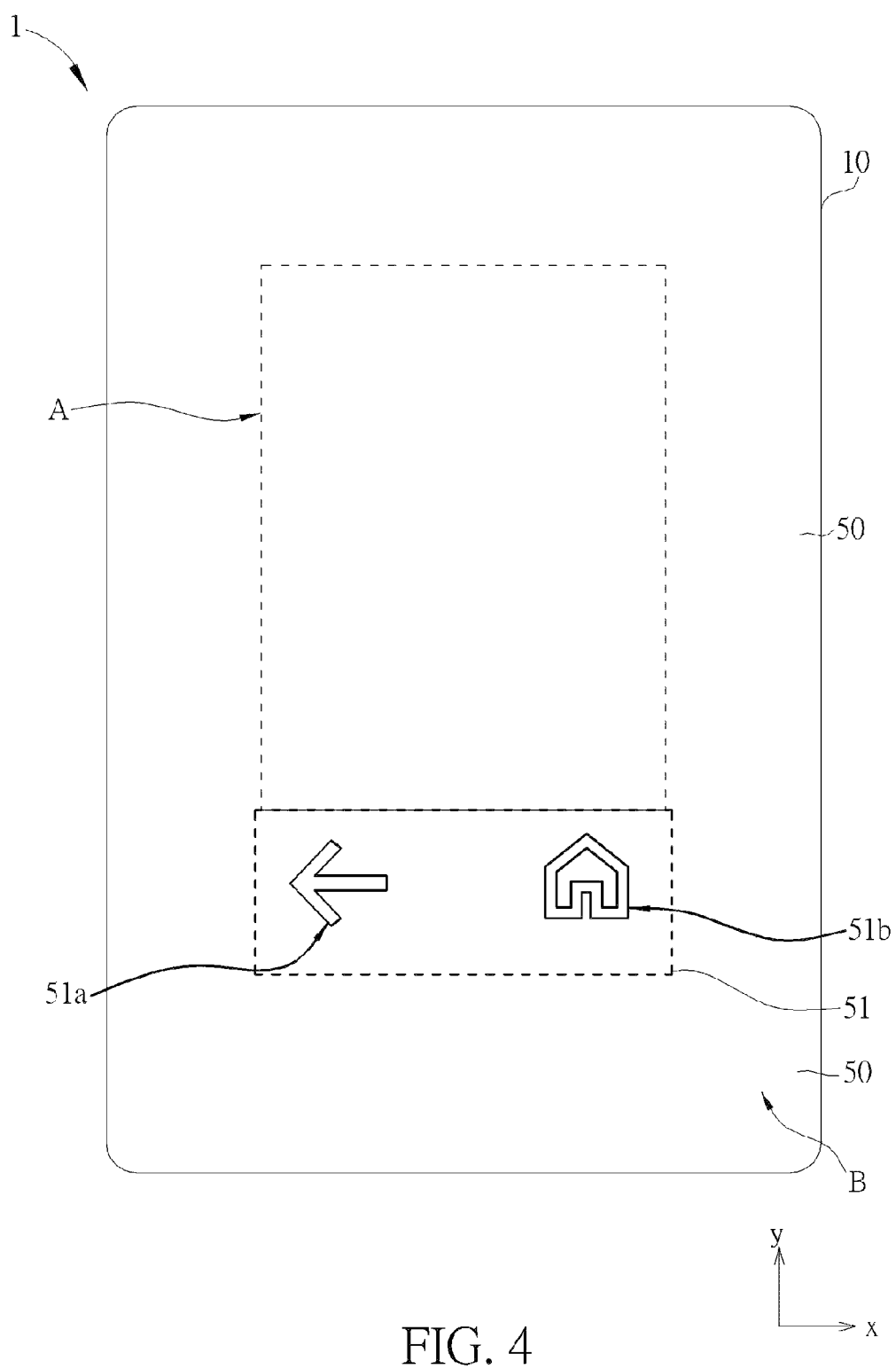
FIGS. 4-7 are top-view diagrams illustrating a touch panel in accordance with the first preferred embodiment of the present invention.

In this embodiment, a cover substrate 10 is first provided (step S1), and a patterned mask layer 50 is formed on the cover substrate 10 (step S2). Referring to FIG. 4, through the formation of the patterned mask layer 50, a display region A and a periphery region B are respectively defined on the cover substrate 10, based on the size of a monitor accompanying the touch panel 1, wherein the display region A is surrounded by the periphery region B. The patterned mask layer 50 can be formed by printing or painting. The patterned mask layer 50 of the present embodiment comprises a pattern region 51, wherein the pattern region 51 comprises at least one hallow pattern, such as two hollow patterns 51a and 51b serving as virtual buttons, but not limited thereto.

Figure 5:
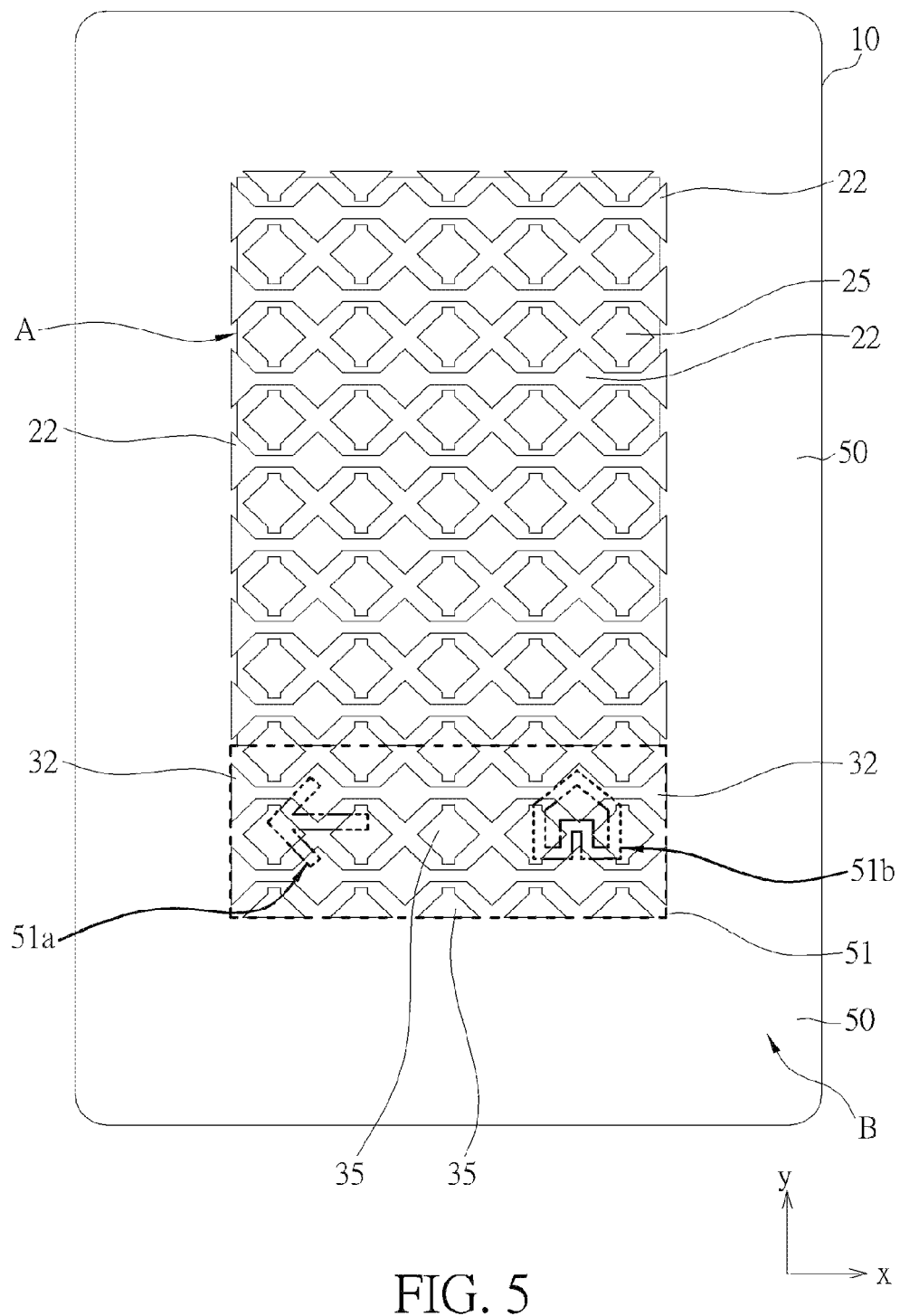

After the step S2, a conductive layer is coated (step S3) and then patterned (step S4). Referring to FIG. 5, the conductive layer of the present embodiment is coated both on the display region A of the cover substrate 10, and on the pattern region 51 of the patterned mask layer 50. Through the patterning, the conductive layer forms a plurality of parallel first sensing electrodes 22 extending along a first axial direction (the X-axis of the present embodiment) within the display region A and a plurality of parallel third sensing electrodes 32 extending along the first axial direction (the X-axis of the present embodiment) within the periphery region B. Moreover, the conductive layer also forms a plurality of second conductive units 25 within the display region A, wherein those second conductive units 25 are disposed along a second axial direction (the Y-axis of the present embodiment) and spaced from each other, and a plurality of fourth conductive units 35 within the periphery region B, wherein those second conductive units 35 are disposed along the second axial direction (the Y-axis of the present embodiment) and spaced from each other.

Figure 6:
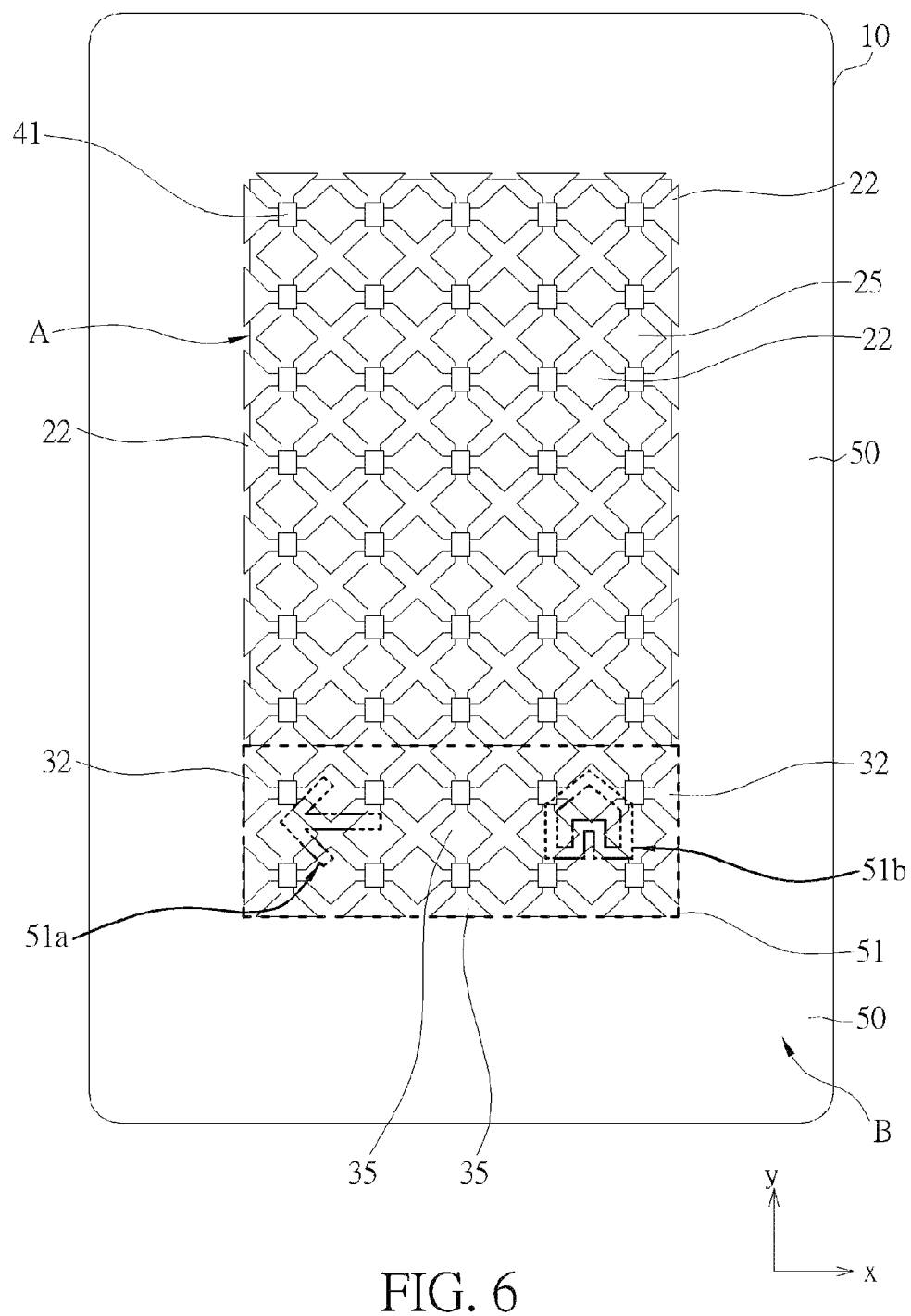

In the following steps, an insulating layer 41 is coated and patterned (step S5). Referring to FIG. 6, the insulating layer 41 is formed through a patterning process on partial regions of the first and third sensing electrodes 22 and 32, wherein the insulating layer 41 is formed between any two adjacent second conductive units 25, and between any two adjacent fourth conductive units 35 along the second axial direction.

Figure 7:
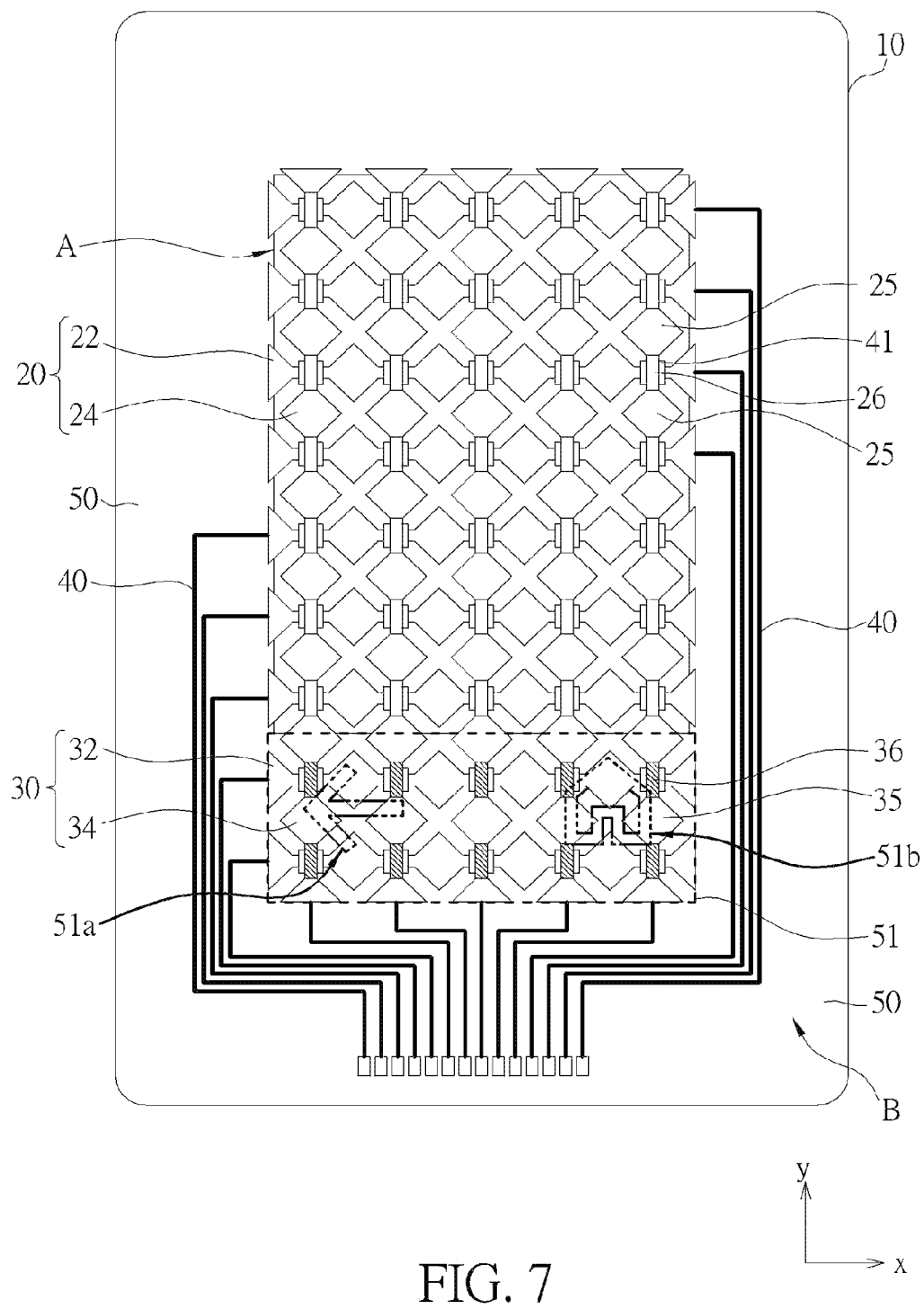

After the step S5, a plurality of first jumpers 26 is formed (step S6) as well as a plurality of second jumpers 36 (step S7). Referring to FIG. 7, the first jumpers 26 are formed on the insulating layer 41 coated on the first sensing electrodes 22 within the display region A so as to electrically connect every two adjacent second conductive units 25 in the second axial direction. The second jumpers 36 are formed on the insulating layer 41 coated on the third sensing electrodes 32 within the periphery region B so as to electrically connect every two adjacent fourth conductive units 35 in the second axial direction. Since the first jumpers 26 and the second jumpers 36 of the present embodiment comprise various materials respectively, the first jumpers 26 and the second jumper 36 are fabricated through different processes. The first jumpers 26 may comprise a transparent conductive material and the second jumpers may comprise a material having better conductivity, such as metals. In accordance with the present invention, the fabrication steps of the first jumpers 26 and the second jumpers 36 are not limited to the order disclosed in the previous embodiments, namely the step S6 can be carried out optionally before or after the step S7.

Specifically, the first jumpers 26 cross over the first sensing electrodes 22 respectively via the insulating layer 41 to electrically connect any two adjacent second conductive units 25 in the second axial direction (the Y axis in this embodiment), thereby forming a plurality of parallel second sensing electrodes 24 disposed along the second axial direction. Likewise, the second jumpers 36 cross over the third sensing electrodes 32 respectively via the insulating layer 41 to electrically connect any two adjacent fourth conductive units 35 in the second axial direction (the Y axis in this embodiment), thereby forming a plurality of parallel fourth sensing electrodes 34 along the second axial direction. In this way, the sensing electrode layer formed with the conductive layer, the insulating layer 41 and the wiring layer can form a first electrode pattern 20 within the display region A of the cover substrate 10, and the patterned mask layer 50 can also form a second electrode pattern 30 thereon.

Furthermore, a trace 40 can be further formed on the patterned mask layer 50 within the periphery region B of the cover substrate 10 during the formation of the second jumpers 36 in the step S7 of the present embodiment, so as to electrically connect the first electrode pattern 20 and the second electrode pattern 30. However, the trace 40 of the present invention can be optionally fabricated during the same process as the first jumpers 26 or during different processes from that of the first jumpers 26 and the second jumpers 36.

Then, a passivation layer coated on the sensing electrode layer is formed (step S8), wherein the passivation layer 80 comprises an inorganic material, such as silicon nitride, silicon oxide and silicon oxynitride, or an organic material, such as acrylic resin or other transparent materials.

Finally, a color film 70 is formed on the passivation layer 80, wherein the color film 70 is disposed within the periphery region B and disposed correspondingly to the patterned mask layer 50 (step S9). The color film 70 can be formed either by painting or printing a color ink, a color photoresist or a light guide ink. Moreover, the painting and printing processes can be carried out multi-times, so that the color film 70 displays more various colors. Additionally, a person who has ordinary skill in the art can understand that, in the present embodiment, the color film 70 is disposed on the passivation layer 80, but not limited to. The color film 70 can also be disposed at any place corresponding to the patterned mask layer 50 and that allows a color display in the hollow patterns 51a and 51b of the pattern region 51 of the patterned mask layer 50 when observing the touch panel 1 from the front.

The following description will detail the different embodiments of the touch panel of the present invention. To simplify the description, the following description will detail the dissimilarities among the different embodiments and the identical features will not be redundantly described. In order to compare the differences between the embodiments easily, the identical components in each of the following embodiments are marked with identical symbols.

Figure 8:
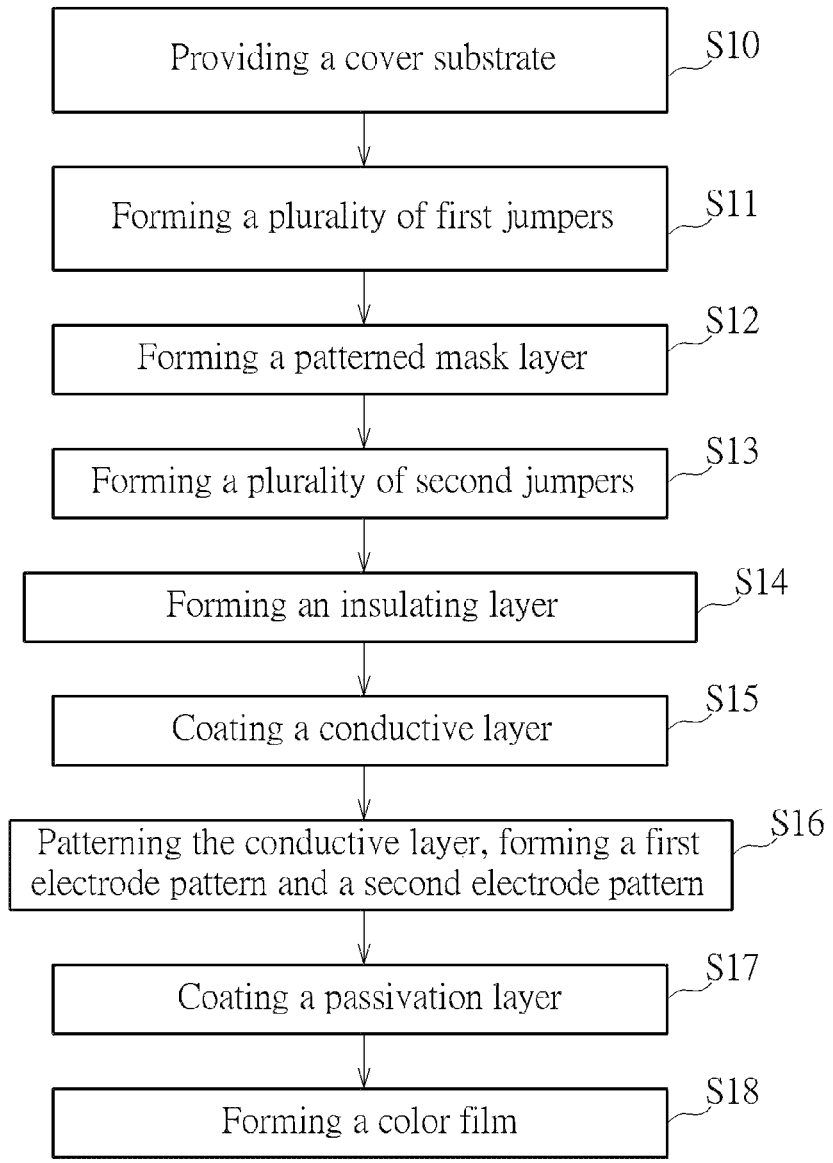
FIG. 8 is a flow chart illustrating the fabrication of a touch panel in accordance with a second preferred embodiment of the present invention.

In the fabrication method of the first preferred embodiment, the sensing electrode layer is fabricated by forming a patterned conductive layer at first, coating an insulating layer thereon, and then forming a plurality of first jumpers and a plurality of second jumpers on the insulating layer to complete first electrode patterns and second electrode patterns on the sensing electrode layer. Thus, the sensing electrode layer is fabricated through above described fabrication, which can be defined as a standard process. However, the sensing electrode layer can also be fabricated through a reverse process by forming a plurality of jumpers first, coating an insulating layer thereon, and then forming a conductive layer. In the following, the fabrication method of the touch panel according to the second preferred embodiment of the present invention will be detailed with reference to FIG. 8 based on the cross-sectional diagram of FIG. 9. Also, top-view diagrams in FIGS. 10-13 illustrating the fabrication method of the touch panel 2 according to the second preferred embodiment of the present invention can also be referred to.

It is noted that, a display region A and a periphery region B are respectively defined on a cover substrate 10 in the present embodiment, based on the size of a monitor accompanying the touch panel 1. The definition of the display region A and the periphery region B have been disclosed in the above embodiments, and will not be further detailed herein. In the present embodiment, the display region A is surrounded by the periphery region B.

First, a cover substrate 10 (step S10) is provided, a plurality of first jumpers 26 (step S11) is formed within the display region A, and then a patterned mask layer 50 is formed on the cover substrate 10 (step S12) respectively. It is noted that, in the present embodiment, the formation of the first jumpers 26 within the display region A is prior to that of the patterned mask layer 50 within the periphery region B. In this way, the patterned mask layer 50 can no longer be destructed by high temperatures generated while forming the first jumpers 26. However, the fabrication of the patterned mask layer 50 in the present invention is no limited to the above description, and can also be fabricated after the formation of the first jumpers 26 according to the actual requirements. Furthermore, like in the first embodiment, the patterned mask layer 50 can comprise an opaque material, such as a black photoresist that may be formed through a printing or a coating process. Moreover, the patterned mask layer 50 of the present embodiment further comprises a pattern region 51, wherein the pattern region 51 comprises at least one hallow pattern, such as hollow patterns 51a and 51b serving as a return button and a home button in the present embodiment, but not limited thereto. The type and amount of hollow patterns of the pattern region 51 can be modified according to the actual requirements and can further comprise other buttons like menu buttons or switch buttons.

Figure 11:
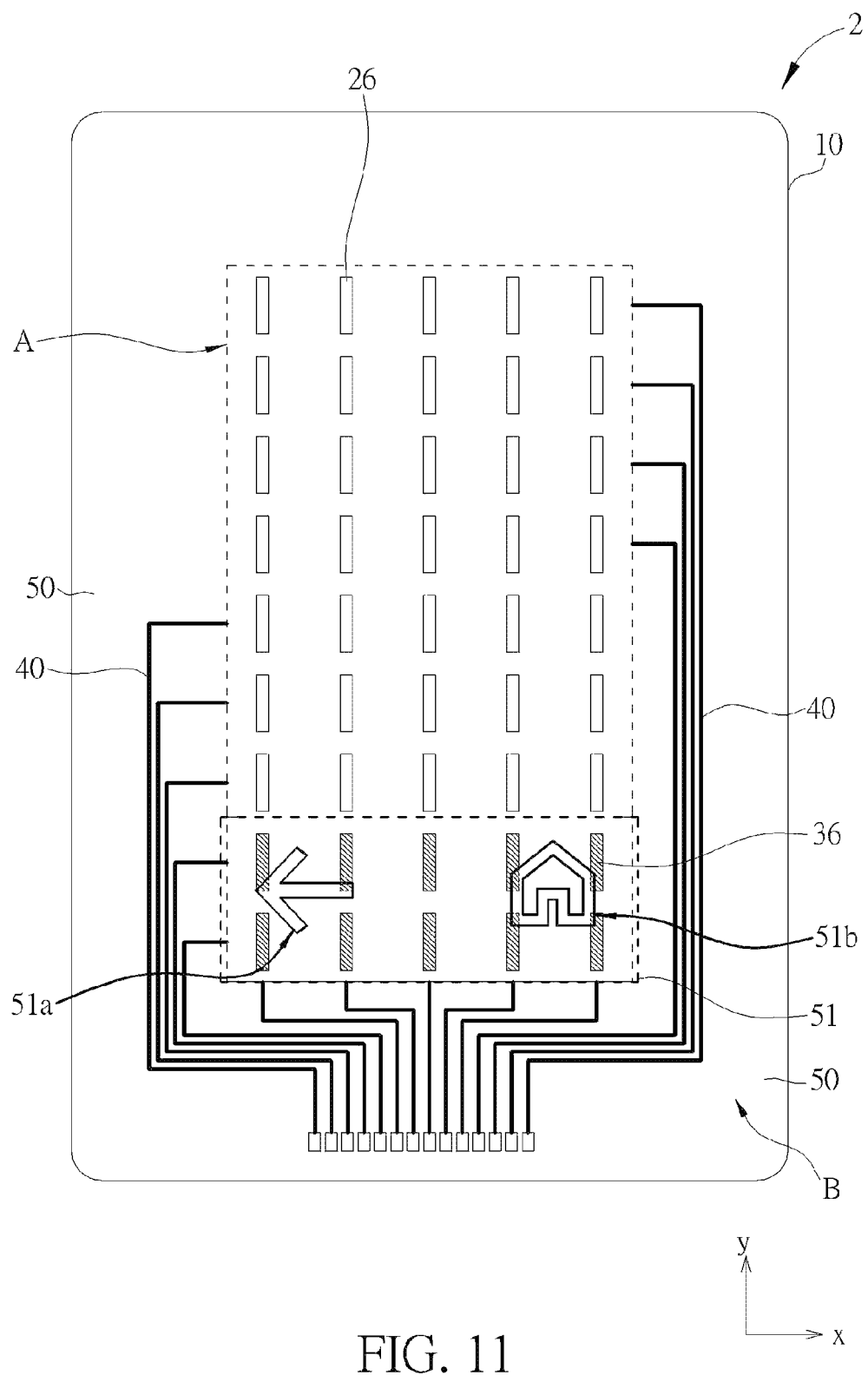

Please refer to FIG. 11, a plurality of second jumpers 36 is formed (step S13) on the patterned mask layer 50 within the periphery region B, wherein the second jumpers 36 preferably comprise a metal material, wherein such metal material not only increases a transmission rate of the touch panel 2, especially at the periphery region B, but also provides a preferred attachment (in comparison with a transparent conductive material, such as ITO) for the patterned mask layer 50 (generally made from black photoresists or inks) to avoid possible detachments and breakages of the electrode patterns at the periphery region B. Besides, when forming the second jumpers 36, it is preferable to form a plurality of traces 40 at the same time, so as to simplify the overall fabrication process. The fabrication of the second jumpers 26 and of the traces 40 of the present invention is not limited to the steps described above, and can use different processes or different orders. According to the present invention, material properties and the way of fabricating the second jumpers 36 and the traces 40 are almost similar to those described in the first preferred embodiment and will not be further detailed herein.

Figure 12:
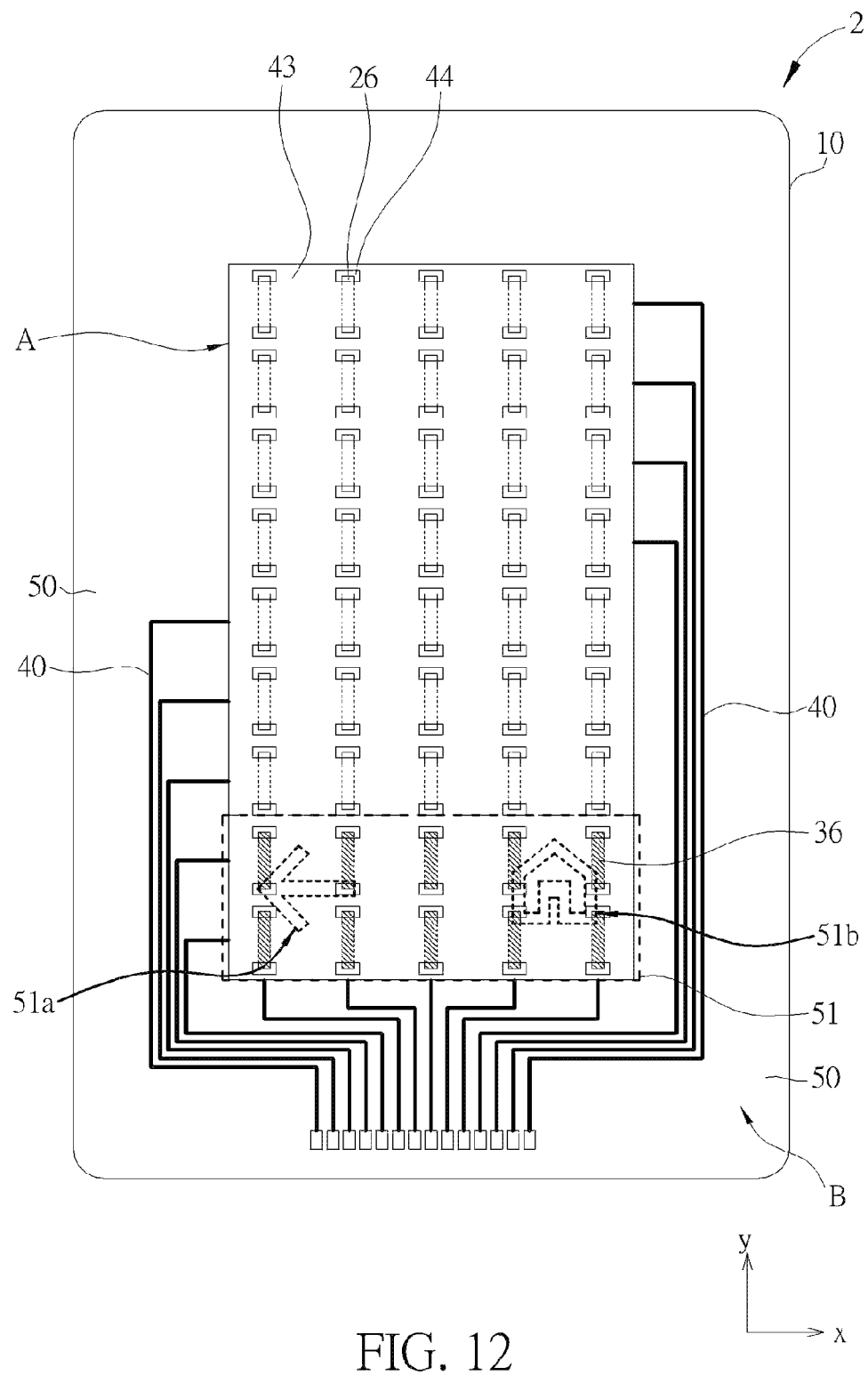

Referring to FIG. 12, an insulating layer 43 coated on the display region A and the periphery region B is formed (step S14), wherein the insulating layer 43 is formed as a whole film, wherein the cover substrate 10, the patterned mask layer 50, each of the first jumpers 26 and each of the second jumpers 36 are covered with the insulating layer 43. The insulating layer 43 is then patterned to form a plurality of via holes 44, wherein the first jumpers 26 and the second jumpers 36, especially at both ends, are exposed by the via holes 44. Although having a different shape from that of the first embodiment, the insulating layer 43 of the present embodiment still protects against electrode patterns followed-up and prevents from interferences between various magnetic shafts in various directions. The insulating layer 43 of the present embodiment is not limited to the above description and can be further used in other embodiments. For example, the insulating layer 41 of the first preferred embodiment can also be used in the present embodiment, wherein the first jumpers 26 and the second jumpers 36 are covered with the insulating layer 41. According to the present invention, the insulating layer 41 in the first preferred embodiment can also replaces the insulating layer 43 in the second preferred embodiment.

Figure 13:
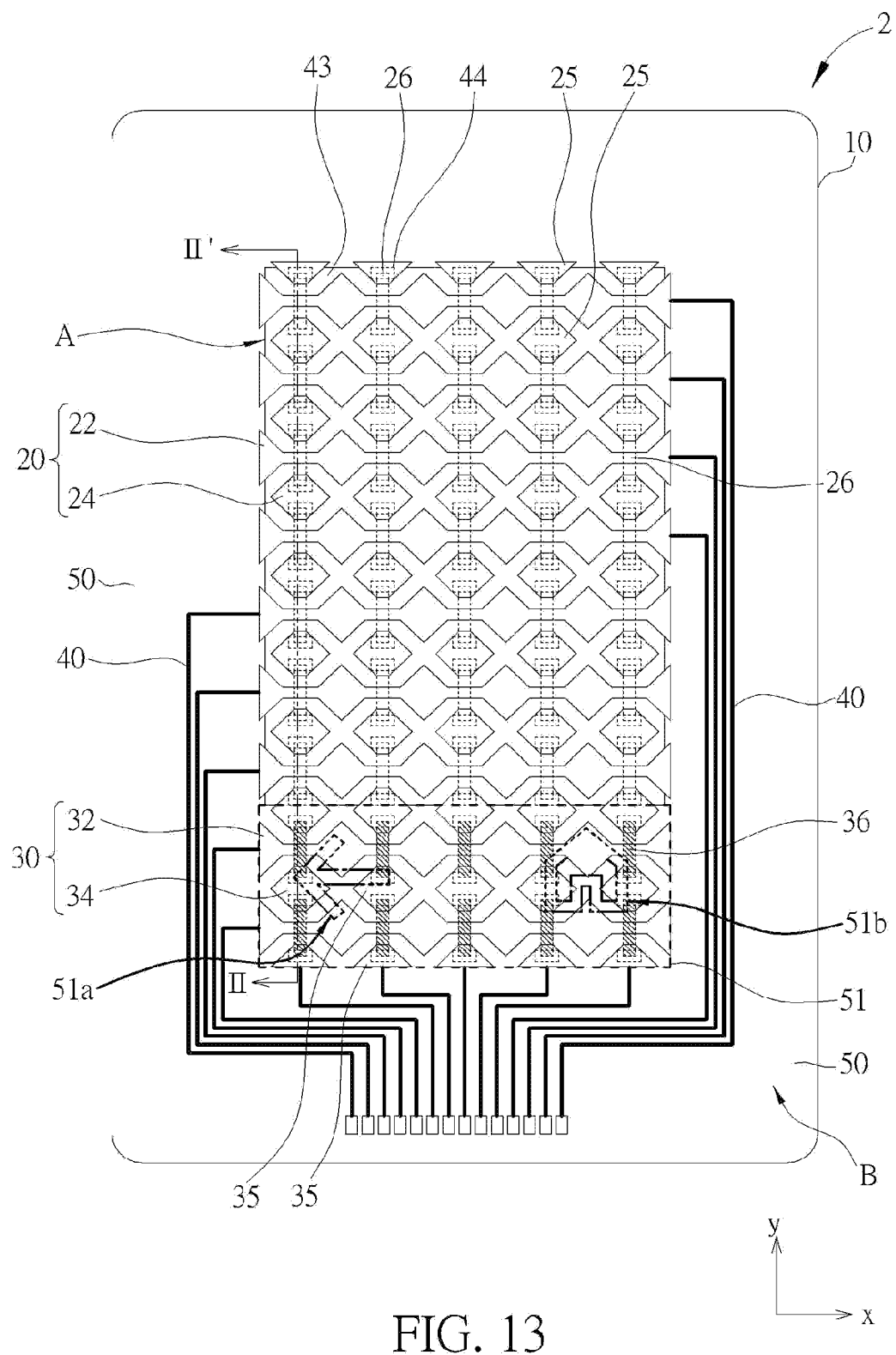

Referring to FIG. 13, a conductive layer is coated on the insulating layer 43 and each via holes 44 (step S15), and then the conductive layer is patterned to form a first electrode pattern 20 and a second electrode pattern 30 (in step S16) within the display region A and the periphery region B respectively. The conductive layer forms a plurality of parallel first sensing electrodes 22 extending along a first axial direction (being the X-axis of the present embodiment) within the display region A, and a plurality of parallel third sensing electrodes 32 extending along the first axial direction (the X-axis of the present embodiment) within the periphery region B. In addition, the conductive layer further forms a plurality of second conductive units 25 within the display region A, wherein the second conductive units are spaced from each other along a second direction (the Y-axis of the present embodiment). In the present embodiment, each via hole 44 on the insulating layer 43 is covered with a second conductive unit 25, wherein any two adjacent conductive units are electrically in contact with each other via the first jumpers 26. In this way, a plurality of second sensing electrodes 24 parallel to each other and disposed along the second axial direction is further formed on the conductive layer. Similarly, each via hole 44 on the insulating layer 43 is covered with a fourth conductive unit 35, wherein any two adjacent conductive units are electrically in contact with each other via the second jumpers 36, and thus, a plurality of fourth sensing electrodes 34, parallel to each other and disposed along the second axial direction is further performed on the conductive layer.

Figure 9:
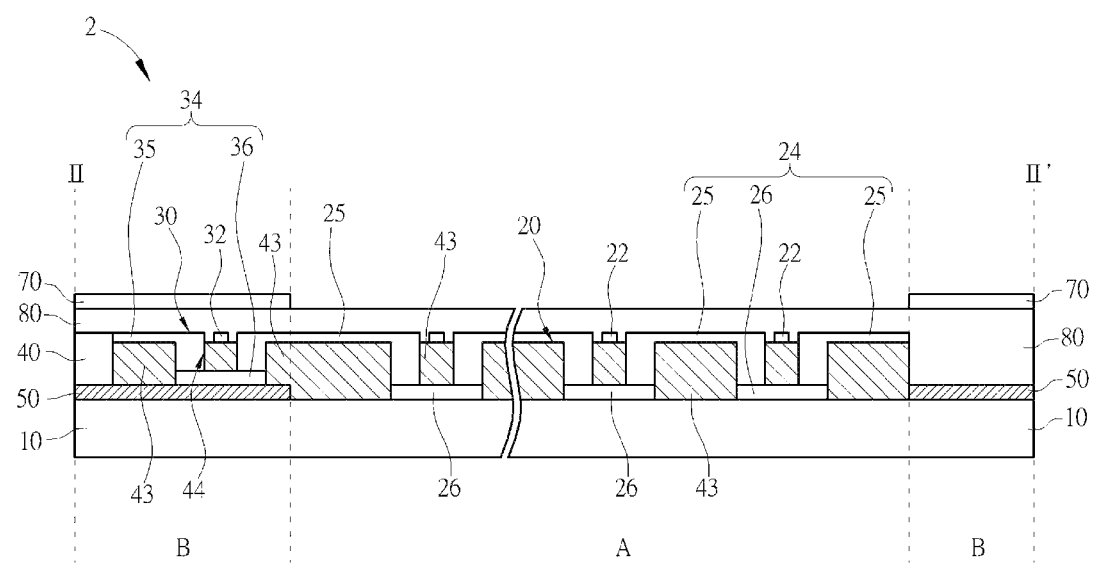
FIG. 9 is a cross-sectional diagram of a touch panel in accordance with the second preferred embodiment of the present invention.
Figure 10:
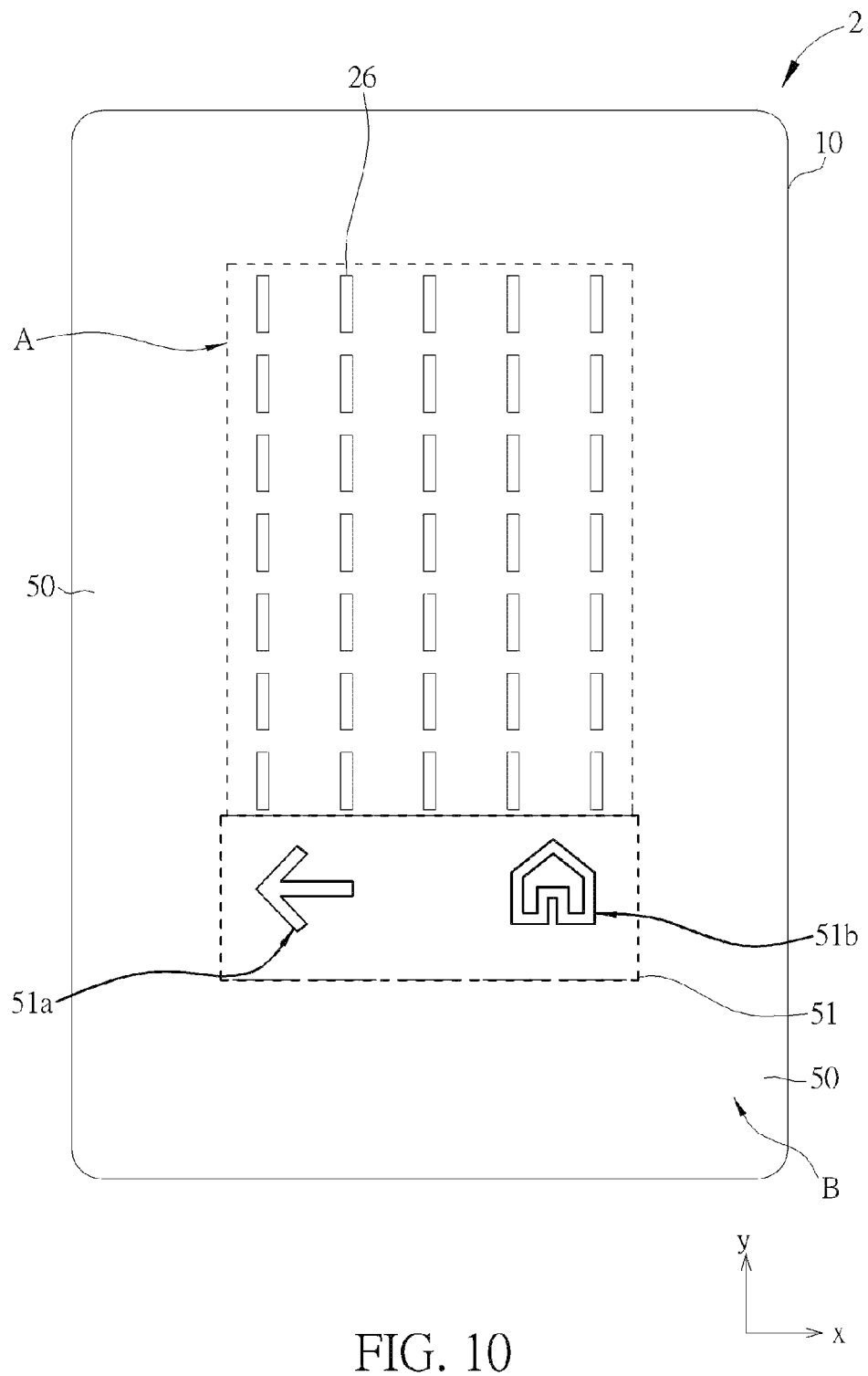
FIGS. 10-13 are top-view diagrams illustrating a touch panel in accordance with the second preferred embodiment of the present invention.

Finally, a passivation layer 80 is formed (step S17) and a color film 70 is formed (step S18) within the periphery region B and correspondingly to the pattern region 51, so as to obtain the touch panel 2 of the present embodiment. With reference to FIG. 9, the touch panel 2 is fabricated through reverse processes, namely first forming the jumpers (including the first jumpers 26 and the second jumpers 36), followed by forming the electrode patterns (including the first electrode patterns 20 and the second electrode patterns 30). In this way, the second jumpers 36 directly contact the patterned mask layer 50, thereby achieving enhanced attachment in between and so as to prevent from detachments and breakages of the second electrode pattern 30 within the periphery region B. In the present embodiment, a fabrication of the touch panel is carried out in a different processing order, in comparison with the first preferred embodiment. However, the rest of the present embodiment, as well as the characteristics of other parts, material properties and the way of fabricating, are almost similar to those described in the first preferred embodiment and will not be further detailed herein.

Figure 14:
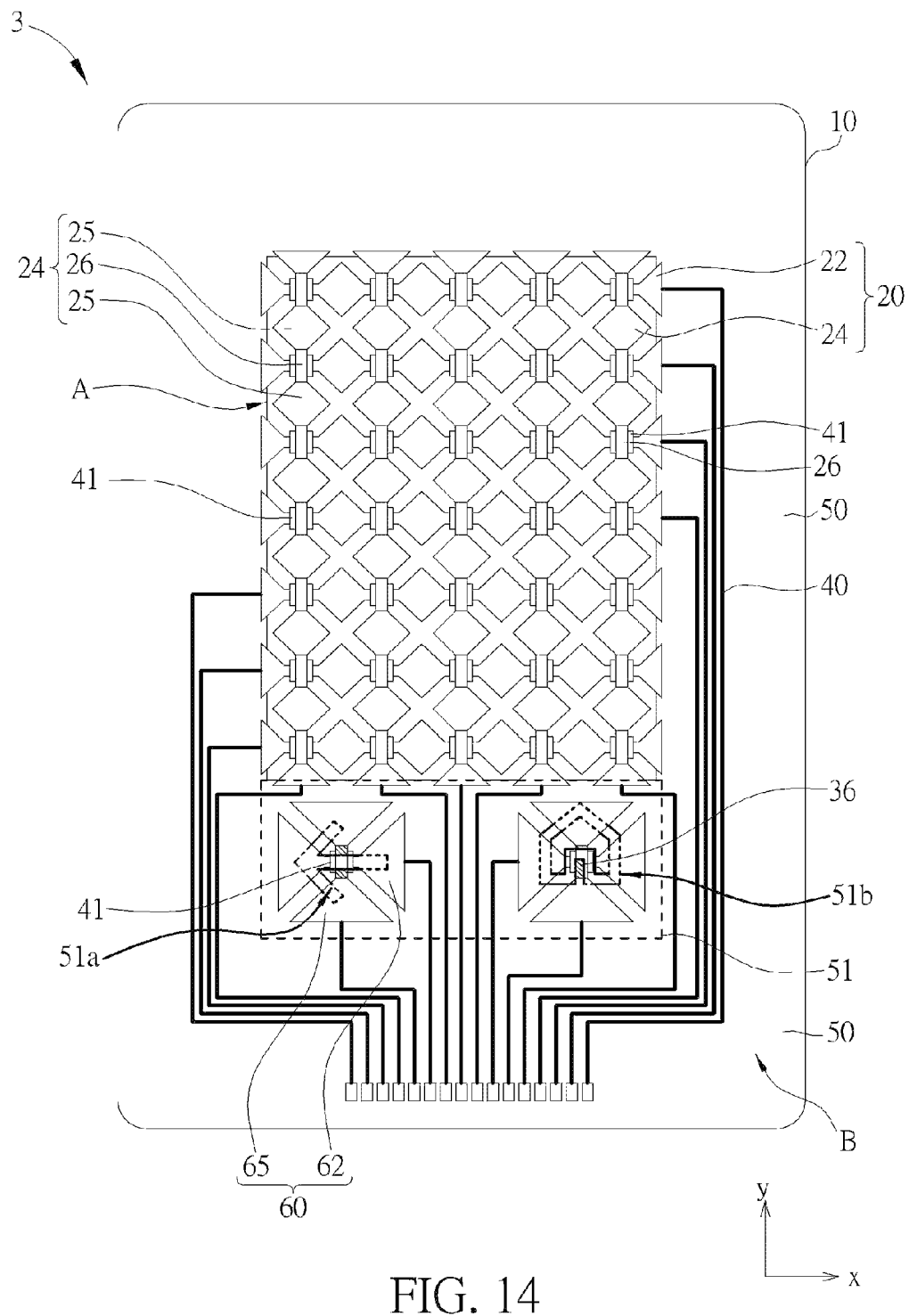
FIG. 14 is a top-view diagram illustrating a touch panel in accordance with a third preferred embodiment of the present invention.

In another preferred embodiment of the present invention, distributions of the electrode patterns can be modified. FIG. 14 illustrates a top-view diagram of a touch panel 3 according to the third preferred embodiment of the present invention. As shown in FIG. 14, the touch panel 3 of the present embodiment is similar to the touch panel 1 of the first preferred embodiment as shown in FIG. 7, especially the structures and material properties. In contrast to the touch panel 1 of the first preferred embodiment, the touch panel 3 of the present embodiment further comprises a third electrode pattern 60 disposed within the periphery region B, wherein the third electrode pattern 60 is an independent design distinct from the first electrode pattern 20. It is noted that, there is no direct relation between the third electrode pattern 60 and the first electrode pattern 20.

The third electrode pattern 60 comprises a plurality of fifth sensing electrodes 62 disposed along the first axial direction (the X-axis in the present embodiment), and a plurality of sixth sensing electrodes 65 along the second axial direction (the Y-axis in the present embodiment) and spaced from each other. A plurality of second jumpers 36 cross over the fifth sensing electrodes 62 via an insulating layer 41 to electrically connect every two adjacent sixth sensing electrodes 65 and then further connect to an exterior processor via traces 40. Besides, in the present embodiment, the third electrode pattern 60 is only disposed at the periphery region B correspondingly to the hollow patterns 51a and 51b, without being disposed at any other place. Furthermore, the third electrode pattern 60 of the present embodiment is not limited to the above description and can be further used in other embodiments. The third electrode pattern 60 can be further used in the first and second preferred embodiments, for example incorporated in the reverse process of the second preferred embodiment of the present invention.

In summary, the touch panel and the fabrication method thereof of the present invention are characterized by forming electrodes both within the display region and the periphery region, as well as forming virtual buttons within the periphery region via the patterned mask layer, so as to achieve various touching responses on the display region and the periphery region of the touch panel respectively. In this way, the present invention can achieve smoothness on a surface of the touch panel and ease for cleaning. Moreover, the touch panel of the present invention comprises various materials in the jumpers formed on the electrode patterns within the display region and the periphery region respectively, so that the display region will provide enhanced light transmittance and the periphery region will have more reliable jumpers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel having a display region and a periphery region, comprising:
    a cover substrate;
    a patterned mask layer formed on the cover substrate and covering the periphery region thereof, wherein the patterned mask layer includes a pattern region;
    a first electrode pattern disposed on the cover substrate and positioned within the display region of the touch panel, the first electrode pattern comprising:
        a plurality of first sensing electrodes disposed along a first axial direction and parallel to each other;
        a plurality of second sensing electrodes disposed along a second axial direction and parallel to each other, each of the second sensing electrodes comprising a plurality of second conductive units disposed along the second axial direction and spaced apart from each other, wherein the first sensing electrodes are electrically isolated from the second sensing electrodes; and
        a plurality of first jumpers, wherein every two adjacent second conductive units are electrically connected via the first jumpers; and
    at least one second electrode pattern disposed on the patterned mask layer and positioned within the periphery region of the touch panel, the second electrode pattern comprising:
        a plurality of third sensing electrodes disposed along the first axial direction and parallel to each other;
        a plurality of fourth sensing electrodes disposed along the second axial direction and parallel to each other, each of the fourth sensing electrodes comprising a plurality of fourth conductive units disposed along the second axial direction and spaced apart from each other, wherein the third sensing electrodes are electrically isolated from the fourth sensing electrodes; and
        a plurality of second jumpers, wherein every two adjacent fourth conductive units are electrically connected via the second jumpers; and
    wherein the first jumpers in the display region and the second jumpers in the peripheral region comprise different materials.

2. The touch panel of claim 1, wherein the at least one second electrode pattern is electrically connected to the first electrode pattern and serves as an extension of the first electrode pattern.

3. The touch panel of claim 1, wherein the pattern region comprises a hollow pattern.

4. The touch panel of claim 1, further comprising a color film corresponding to the patterned mask layer.

5. The touch panel of claim 1, wherein the first electrode pattern and the second electrode pattern are classified as a sensing electrode layer.

6. The touch panel of claim 5, further comprising a passivation layer disposed on the sensing electrode layer.

7. The touch panel of claim 5, wherein the sensing electrode layer further comprises an insulating layer disposed between the first sensing electrodes and the second sensing electrodes, as well as between the third sensing electrodes and the fourth sensing electrodes.

8. The touch panel of claim 5, further comprising a trace corresponding to the periphery region, wherein the trace is electrically connected to the first electrode pattern and the at least one second electrode pattern.

9. The touch panel of claim 1, wherein the first jumpers comprise a transparent conductive material and the second jumpers comprise a metal material.

10. A fabrication method of a touch panel having a display region and a periphery region surrounding the display region, wherein the fabrication method of the touch panel comprises:
   forming a patterned mask layer on a cover substrate, wherein the patterned mask layer comprises a pattern region, and the patterned mask layer defines the periphery region; and
   forming a sensing electrode layer having a first electrode pattern corresponding to the display region and a second electrode pattern corresponding to the pattern region, wherein the forming a sensing electrode layer comprises:
      coating a conductive layer on the cover substrate and the patterned mask layer;
      patterning the conductive layer to form a plurality of parallel first sensing electrodes disposed along a first axial direction within the display region and a plurality of parallel third sensing electrodes disposed along the first axial direction within the periphery region, and to form a plurality of second sensing electrodes disposed along a second axial direction and spaced apart from each other within the display region and a plurality of fourth sensing electrodes disposed along the second axial direction and spaced apart from each other within the periphery region;
      coating and patterning an insulating layer at partial regions of the first sensing electrodes and partial regions of the third sensing electrodes;
      forming first jumpers on the insulating layer coated on the first sensing electrodes, wherein the first jumpers electrically connect every two adjacent second conductive units; and
      forming second jumpers on the insulating layer coated on the third sensing electrodes, wherein the second jumpers electrically connect every two adjacent fourth conductive units;
   wherein the first jumpers within the display region and the second jumpers within the periphery region comprise different materials.

11. The fabrication method of claim 10, wherein the second jumpers are formed on the patterned mask layer and directly contact the patterned mask layer.

12. The fabrication method of claim 10, further comprising forming a color film corresponding to the patterned mask layer.

13. The fabrication method of claim 10, further comprising forming a passivation layer on the sensing electrode layer.

14. The fabrication method of claim 10, wherein the first jumpers comprise a transparent conductive material and the second jumpers comprise a metal material.

15. The fabrication method of claim 10, further comprising a trace corresponding to the periphery region, wherein the trace is electrically connected to the first electrode pattern and the second electrode pattern.

16. A fabrication method of a touch panel having a display region and a periphery region surrounding the display region, wherein the fabrication method of the touch panel comprises:
   forming a patterned mask layer on a cover substrate, wherein the patterned mask layer comprises a pattern region, and the patterned mask layer defines the periphery region; and
   forming a sensing electrode layer having a first electrode pattern corresponding to the display region and a second electrode pattern corresponding to the pattern region, wherein the forming a sensing electrode layer comprises:
      forming a plurality of first jumpers on the cover substrate within the display region;
      forming a plurality of second jumpers on the patterned mask layer within the periphery region;
      coating an insulating layer on the cover substrate, the patterned mask layer, the first jumpers and the second jumpers;
      patterning the insulating layer to form a plurality of via holes, wherein the via holes correspond to two ends of the first jumpers and the second jumpers respectively to expose partial regions of the first jumpers and the second jumpers;
      coating a conductive layer on the insulating layer and the via holes; and
      patterning the conductive layer to form a plurality of parallel first sensing electrodes disposed along a first axial direction within the display region, a plurality of parallel third sensing electrodes disposed along the first axial direction within the periphery region, a plurality of second conductive units disposed along a second axial direction and spaced from each other within the display region, and a plurality of fourth conductive units disposed along the second axial direction and spaced from each other within the periphery region, wherein the via holes are covered with the second conductive units and the fourth conductive units to electrically connect every two adjacent second conductive units and every two adjacent fourth conductive units via the first jumpers and the second jumpers respectively;
   wherein the first jumpers within the display region and the second jumpers within the periphery region comprise different materials.

* * * * *